(12) United States Patent
Erices

(10) Patent No.: US 9,751,414 B2
(45) Date of Patent: Sep. 5, 2017

(54) ELECTRIC PLUG-IN CONNECTION, IN PARTICULAR FOR ELECTRIC VEHICLES

(71) Applicant: Kiekert AG, Heiligenahus (DE)

(72) Inventor: Bernado Erices, Bergisch-Gladbach (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 15/031,404

(22) PCT Filed: Oct. 14, 2014

(86) PCT No.: PCT/DE2014/100362
§ 371 (c)(1),
(2) Date: May 23, 2016

(87) PCT Pub. No.: WO2015/062582
PCT Pub. Date: May 7, 2015

(65) Prior Publication Data
US 2016/0272077 A1   Sep. 22, 2016

(30) Foreign Application Priority Data

Oct. 28, 2013  (DE) .......................... 10 2013 017 842

(51) Int. Cl.
*H01R 13/62*     (2006.01)
*B60L 11/18*     (2006.01)
(Continued)

(52) U.S. Cl.
CPC ........... *B60L 11/1818* (2013.01); *B60L 1/003* (2013.01); *B60L 3/0069* (2013.01);
(Continued)

(58) Field of Classification Search
CPC ............ H01R 13/6275; H01R 13/6397; H01R 13/60; H01R 2103/00; H01R 13/6278; B60L 11/1818
(Continued)

(56) References Cited

U.S. PATENT DOCUMENTS 5,429,524 A * 7/1995 Wakata ................. B60L 3/0069
                                                        439/310
6,923,666 B1 * 8/2005 Liao ....................... H01R 31/06
                                                        439/131
(Continued)

FOREIGN PATENT DOCUMENTS

CN   102 668 264 A   9/2012
DE   694 11 485 T2   11/1998
(Continued)

OTHER PUBLICATIONS

International Search Report for corresponding Patent Application No. PCT/DE2014/100362 dated Mar. 18, 2015.
(Continued)

*Primary Examiner* — Abdullah Riyami
*Assistant Examiner* — Vladimir Imas
(74) *Attorney, Agent, or Firm* — Renner, Otto, Boisselle & Sklar, LLP

(57) ABSTRACT

The present invention relates to an electric plug-in connection, in particular for electric vehicles. Said plug-in connection is equipped with a plug-in connector (1, 2) substantially consisting of a socket (1) and a plug (2). The connection is also provided with a locking unit (4, 5) comprising at least one blocking element (4) and a transmission element (5) for detachably coupling the socket (1) and the plug (2). Further, an actuator (8) is provided, for actuating the transmission element (5) together with the blocking element (4) arranged
(Continued)

at one end thereof. According to the invention, the transmission element (5) is in the form of a gear arrangement (5).

10 Claims, 3 Drawing Sheets

(51) Int. Cl.
  *H01R 13/639* (2006.01)
  *B60L 1/00* (2006.01)
  *B60L 3/00* (2006.01)
  *H01R 13/627* (2006.01)

(52) U.S. Cl.
  CPC ...... *B60L 11/1861* (2013.01); *H01R 13/6397* (2013.01); *B60L 2230/10* (2013.01); *B60L 2270/32* (2013.01); *B60L 2270/34* (2013.01); *H01R 13/6278* (2013.01); *H01R 2201/26* (2013.01); *Y02T 10/7005* (2013.01); *Y02T 10/705* (2013.01); *Y02T 10/7044* (2013.01); *Y02T 10/7088* (2013.01); *Y02T 90/14* (2013.01)

(58) Field of Classification Search
  USPC ........................................ 439/304, 305, 310
  See application file for complete search history.

(56) References Cited

U.S. PATENT DOCUMENTS

| | | | | |
|---|---|---|---|---|
| 8,016,604 B2* | 9/2011 | Matsumoto | ........... | B60L 3/0069 439/304 |
| 8,075,329 B1* | 12/2011 | Janarthanam | ....... | B60L 11/1818 439/304 |
| 8,172,599 B2* | 5/2012 | Konchan | ............. | B60L 11/1818 320/108 |
| 8,523,589 B2* | 9/2013 | Kurumizawa | ..... | H01R 13/6275 439/304 |
| 8,616,909 B2* | 12/2013 | Kurumizawa | .......... | E05B 83/00 320/109 |
| 8,678,847 B2* | 3/2014 | Inoue | .................. | B60L 11/1818 439/352 |
| 9,216,656 B2* | 12/2015 | Nakajima | .......... | H01R 13/6275 |
| 2011/0281452 A1* | 11/2011 | Kurumizawa | .......... | B60L 11/14 439/304 |
| 2013/0078840 A1* | 3/2013 | Inoue | .................. | B60L 11/1818 439/345 |
| 2013/0255333 A1 | 10/2013 | Kurumizawa et al. | | |
| 2013/0255334 A1* | 10/2013 | Kurumizawa | .......... | E05B 83/00 70/258 |

FOREIGN PATENT DOCUMENTS

| | | | | |
|---|---|---|---|---|
| DE | 10 2009 057 426 A1 | 6/2011 | | |
| DE | 10 2011 050783 A1 | 8/2012 | | |
| DE | WO 2015062582 A1 * | 5/2015 | .......... | B60L 11/1818 |
| EP | 0 646 995 A2 | 4/1995 | | |
| JP | H06 310208 A | 11/1994 | | |
| WO | 2013/047322 A1 | 4/2013 | | |

OTHER PUBLICATIONS

Written Opinion for corresponding Patent Application No. PCT/DE2014/100362 dated Mar. 18, 2015.
International Preliminary Report on Patentability for corresponding Patent Application No. PCT/DE2014/100362 dated May 3, 2016.

* cited by examiner

ELECTRIC PLUG-IN CONNECTION, IN PARTICULAR FOR ELECTRIC VEHICLES

The invention relates to an electric plug-in connection for, in particular, electric vehicles with a plug-in connector substantially consisting of a socket and plug and with a locking unit with at least one blocking element and a transmission element for detachably coupling of socket and plug and with an actuator for actuating the transmission element with the blocking element arranged at one end thereof.

Electric vehicles generally refer to means of transportation, powered by electrical energy. These can be rail vehicles, road vehicles, water craft or even aircraft. The mobility behavior of people using such electric vehicles is mainly described and examined as part of the so-called electric mobility.

As electric vehicles typically contain numerous batteries supplying the electrical energy, recharging at so-called power service stations is of special significance. Such power service stations can be publically or also not publically accessible and are, in the simplest case, sockets. From the socket, the battery of the respective electric vehicle is charged via a cable connection. As the charging process generally takes several hours and is in most cases chargeable, measures for securing or locking the plug-in connector are required.

Otherwise there is the danger that during recharging of the batteries on a parked electric vehicle, unauthorized persons may pull the plug out of the socket, thus interrupting the charging process. As a result, the battery or the several batteries are not charged fully and there is also the danger that unauthorized persons tap electric power without paying for it.

For this purpose an electric plug-in connection for, in particular, electric motor vehicles according to the generic prior art disclosed DE 10 2009 057 426 A1, contains a special actuator for actuating the blocking element. The actuator or housing of the actuator is actually designed to be connected to one of the parts of the plug-in connector, i.e. either for connecting to the socket or the plug. In this way, a locking unit that can be easily installed is provided. Also the arrangement aims to offer simple handling when replacing the locking unit with another locking unit. This has generally proven to be successful.

In the known teaching, the transmission element is designed as a control cable between the actuator and the blocking element arranged at the end. At one of its ends, the respective transmission element is also connected to a holder for the blocking means or blocking element in which the blocking means or blocking element is displaceably arranged. The holder generally contains a flange section for coupling to the socket.—Such a design requires considerable installation and production efforts as the holder and, in particular, the transmission element as well as the blocking element on the end are separately designed and installed. If one takes into consideration that the blocking element is typically designed as a locking pin, malfunctioning cannot be ruled out with absolute certainty. The invention aims to remedy this.

The invention is based on the technical problem of further developing an electric plug-in connection in such a way that its construction and production are simplified, a more advantageous installation is provided and functional reliability is significantly increased again compared to the prior art.

In order to solve this technical problem, a generic electric plug-in connection according to the invention is characterized in that the transmission element is designed as a gear arrangement.

The gear arrangement of the invention can be designed as a deflection gear. Alternatively or in addition, it can also be a transmission or reduction gear. Generally, only a deflection gear is used with the aid of which actuating movements of the actuator are translated into corresponding actuating movements of the blocking element in the other direction. The actuator consequently regularly contains a drive journal.

The actuator is generally a linear actuating element so that the drive journal carries out respective actuating movements in linear direction or in its longitudinal extension on the output side of the actuator. The actuating movements of the drive journal are transferred to the transmission element or onto the gear arrangement provided by the invention and are typically deflected at this point.

It has proven to be advantageous for the drive pin and the actuating element to be arranged to each other at an angle and, in particular, at right angles. As a result, linear actuating movements of the drive journal can be translated into corresponding actuating movements of the actuating element at right angles to said journal. This all is achieved whilst providing a compact design as, in contrast to the generic prior art, bending radii of flexible cables as transmission element are of no relevance in this context.

In addition, the invention offers the additional option of being able to provide a reduction or respective translation of the linear actuating movement of the drive journal when acting on the locking journal. This allows, for instance, also the use of a compact actuator providing only a short actuating travel of the drive journal. This short actuating travel can nevertheless be translated with the aid of the gear arrangement of the invention so that the actuating element carries out sufficient actuating movements on the output side. Either way, the gear arrangement is acted upon by the respective drive journal.

Generally, the actuating element is designed as a locking journal. The control element also interacts with a counter element on the plug-in connector. The counter element is in most cases a recess into which the actuating element engages as locking journal in order to move the locking unit into its functional position "locked". The "unlocked" condition on the other hand corresponds to the locking journal emerging from the respective recess and releasing it. In most cases the recess is located on the plug and locking occurs once the plug is fully pushed into the socket.

It is part of the invention to provide automatic locking. In order to achieve this, the plug pushed (completely) into the socket can act on a respective contact, a switch or another type of sensor, ensuring in turn actuation of the actuator. As a result, the actuator moves the entire actuating element or locking unit from the original "unlocked" position to its "locked" position by the actuating element engaging in the recess of the plug. For this purpose, the actuating element is generally connected to the socket.

In order to attain the "unlocked" position of the locking unit, an operator can activate the switch to move the actuator in counter direction. This results in the actuating element or the locking journal being pulled out of the recess. It is, however, also possible for the "unlocked" position to be attained by the force of a spring. This can even occur automatically when the battery/batteries of the electric vehicle are fully charged. Such a procedure will, however, in most cases be combined or have to be combined with a charging current being switched off in order to prevent unauthorized tapping of electricity. Unlocking must therefore be typically carried out manually by the operator by activation of a switch, with the aid of which the actuator is impinged on in counter direction or it is respectively at least ensured that the locking journal is pulled out of the recess of the plug so that the plug is released inside the socket and can be removed therefrom.

A particularly compact and functional embodiment is characterized by the drive journal and/or the locking journal (each) containing a gear rack section. As the drive journal and actuating element or the locking journal are typically arranged at an angle or right angle to each other, the drive journal and the actuating element or the locking journal can be particularly easily coupled to form a drive means. The arrangement offers the option of coupling the drive journal and actuating element by using at least one gear wheel to form a drive means.

In most cases the design is such that the gear wheel engages with the drive journal and the actuating element or the respective gear rack section. As soon as the drive journal is acted upon by the actuator in its longitudinal direction, this causes a rotation of the gear wheel which in turn produces a respective motion of the actuating element or locking journal by means of the gear rack section of the actuating element, meshing with the gear wheel.

Advantageously the gear arrangement is located in a housing. It has proven to be advantageous for the housing to comprise a bearing part and a cover part. The bearing part typically serves to accommodate and support the drive journal and the locking journal as well as the gear wheel coupling the two journals to produce a drive means. In contrast, the cover part has a predominantly sealing effect. This is further improved by the fact that at least one seal is provided between the two housing parts.

At this point it has proven to be advantageous for at least one housing part and the at least one seal to define a plastic two-component part. The bearing part and cover part are typically made of a thermoplastic plastic such as PE (polyethylene), PP (polypropylene) etc. The seal is, in most cases made from elastomeric plastic, such as EPDM (ethylene propylene rubber) or also SBR (styrene-butadiene rubber). The respective seals and corresponding housing parts or both housing parts can in any case be produced from the respective said plastics. This allows for a compact and cost-effective design.

It has proven to be advantageous for the bearing part as part of the housing for the gear arrangement to have a mounting for the actuator. In most cases the mounting is sealed from the actuator. A comparable seal is provided in the area of the actuating element or locking journal so that, as a whole, an assembly sealed against environmental influences and made up of the actuating element, the transmission element or the gear arrangement or housing accommodating the gear arrangement and lastly the actuator, is provided. This sealed assembly can be fully used as compact installation module in an energy supply unit or power service station and can be mechanically connected to the socket provided in most cases in said service station. For this purpose, the housing is connected to the socket for accommodating the gear arrangement.

As a result, the invention provides an electric plug-in connection that is compact and inexpensive and is also more reliable than prior art. In fact, in particular linear actuating movements of the drive journal on the output side of the actuator can be easily converted into respective linear movements of the actuating element in another direction, in most cases at right angles thereto. Bending radii or other installation restrictions do not have to be observed.

In addition, the actuator is directly flange-mounted to the housing for accommodating the gear arrangement so that the assembly provided and sealed in this manner and consisting of the actuating element, the gear arrangement including the accommodating housing and lastly the actuator can be of a particularly small design. The overall sealed embodiment also allows the direct use with a socket of a power service station or generally an energy supply unit. It is not even necessary for the respective assembly to be separately accommodated in a housing. These are the main advantages.

Below, the invention is explained with reference to a drawing showing only one embodiment, in which:

FIG. 3A the locking unit in its "unlocked" position and FIG. 3B the locking unit in its "locked" position.

The figures show an electric plug-in connection used in particular for the electric recharging of batteries in electric vehicles. For this purpose the electric plug-in connection contains a plug-in connector 1, 2 comprising essentially a socket 1 and a plug 2. The plug 2 is only schematically indicated in FIG. 3B and is inserted in the socket 1 as per the direction of the arrow in FIG. 1. In order to achieve this, a flap K, closing the socket 1 on the outside, must first be opened against the force of a spring.

Figure 1:
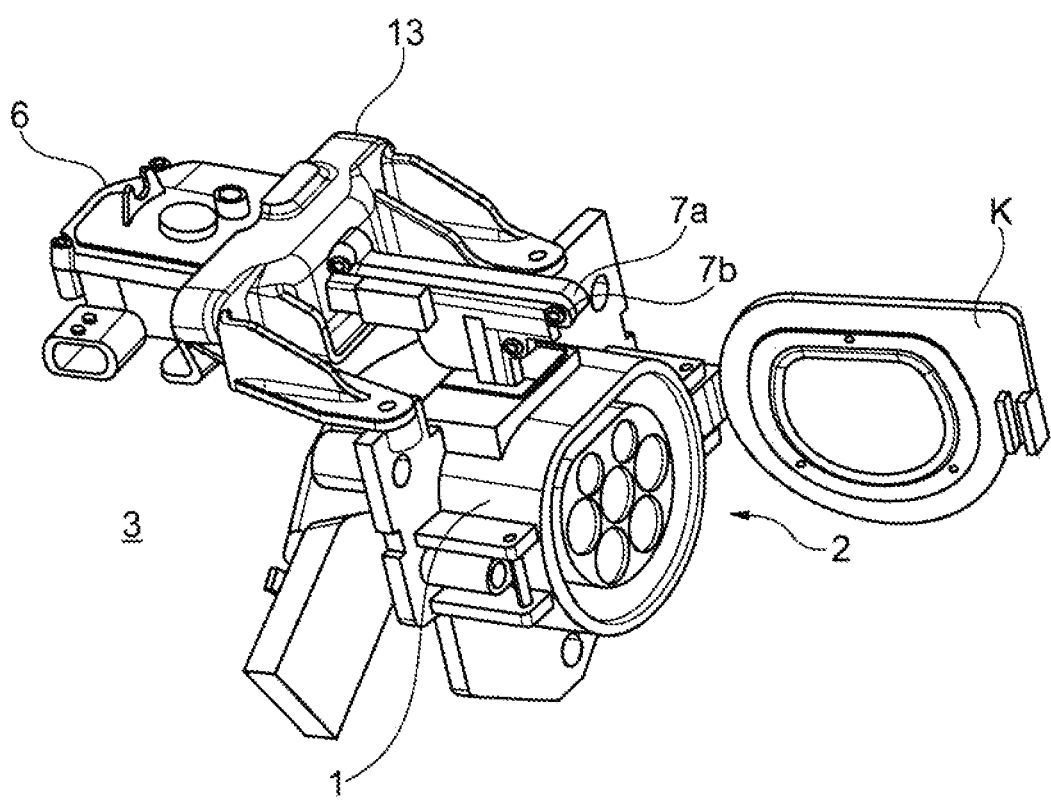
FIG. 1 shows an overview of the electric plug-in connection of the invention.

The entire socket 1 is accommodated in a power supply unit or power service station 3. This is indicated by FIG. 1. In addition, a locking unit 4, 5 is provided. The locking unit 4, 5 essentially comprises a blocking element 4 and a transmission element 5 for detachably coupling or detachably locking socket 1 and plug 2 together. The figure also shows a battery 6 provided for actuation of the transmission element 5 with the blocking element 4 arranged at its end.

Figure 2:
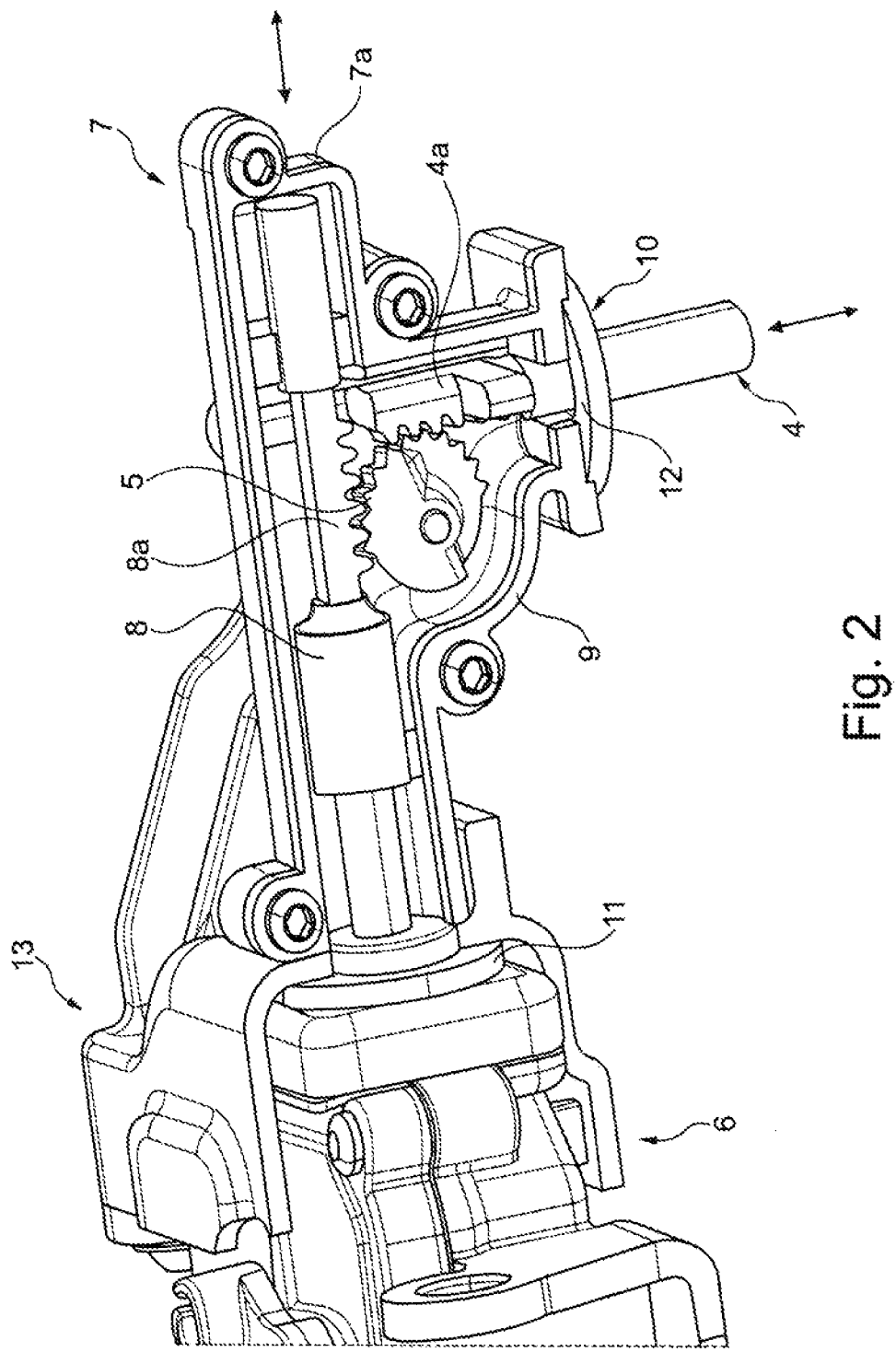
FIG. 2 shows a detailed view of the gear arrangement with a partially opened housing and FIGS. 3A and 3B show the object of FIG. 2 in different functional positions, i.e.

In the embodiment, the transmission element 5 is designed as a gear arrangement 5. In the example, the gear arrangement 5 is a deflection gear 5, which is best apparent from FIG. 2. Alternatively or in addition, the deflection gear 5 can also act as a transmission/reduction gear, which is however not the case in the shown example. In the example, the transmission element 5 or the gear arrangement 5 is finally a gear wheel 5.

The gear wheel 5 or the gear arrangement 5 is arranged in a housing 7. This also applies to a drive journal 8 and the actuating element 4, designed as a locking journal 4 in the example. The drive journal 8 is acted upon by the actuator 6 and carries out a linear movement indicated in FIG. 2 by a double arrow. These linear movements of the drive journal 8 are transformed to linear movements of the actuating element or locking journal 4 by means of the gear arrangement 5. The result is a perpendicular change in direction, as directly apparent from FIG. 2.

In fact the drive journal 8 on one hand and the actuating element or the locking journal 4 on the other hand are arranged to each other at an angle and, according to the embodiment example at right angles. Also, said gear wheel 5 ensures that the drive journal 8 and the actuating element or the locking journal 4 are consequently connected as a drive means. For this purpose, the respective gear wheel 5 is arranged on a respective journal in housing 7.

The drive journal 8 and the locking journal or the actuating element 4 are each equipped with a respective gear rod section 8a or 4a. The gear wheel 5 meshes with both gear rod sections 4a, 8a. For this purpose, gearwheel 5 tangentially engages in each perpendicularly arranged gear rod section 4a, 8a. As a result, actuation of the drive journal 8 in its longitudinal extension by actuator 6 corresponds to the drive journal 8 being moved for instance to the right along the double arrow shown in FIG. 2.

Figure 3A:
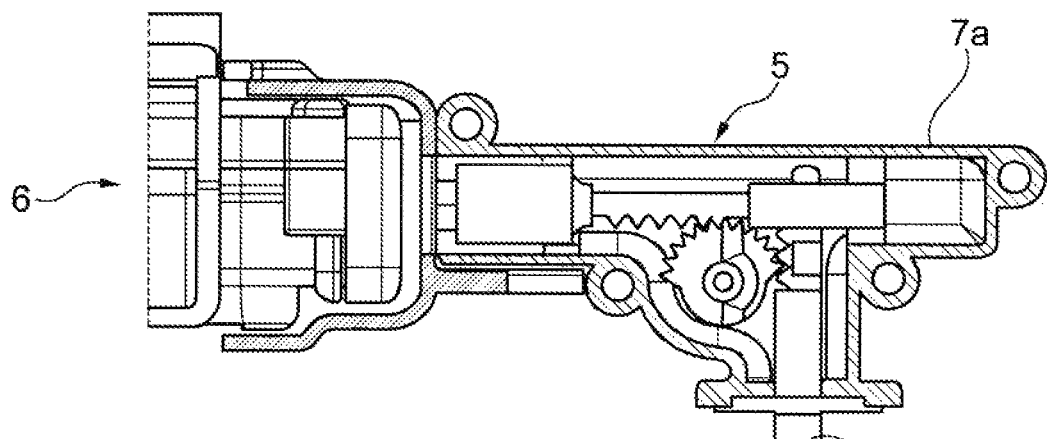
Figure 3B:
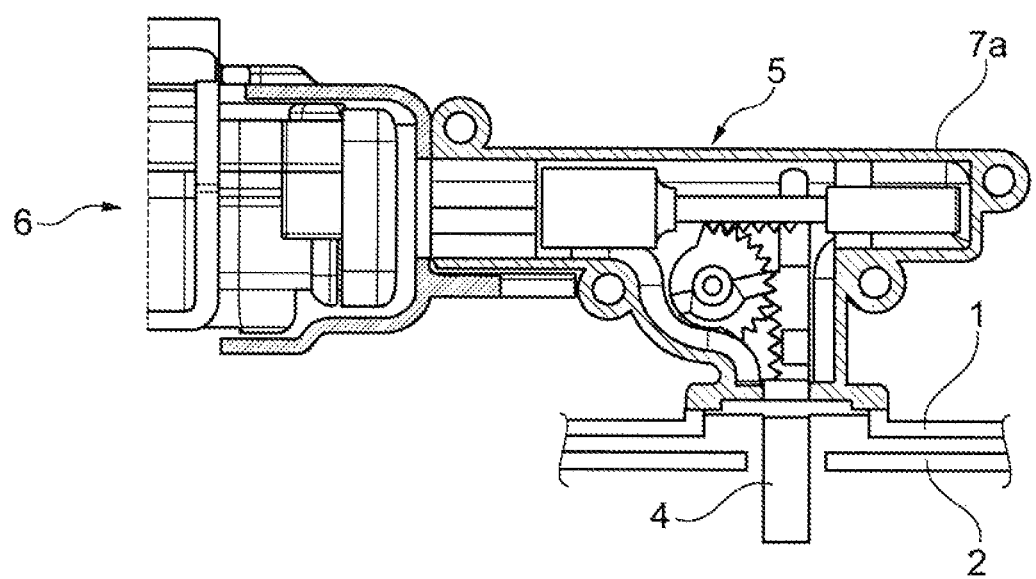

As a result, the thus produced clockwise rotation of the gear wheel 5 ensures that the actuating element 4, meshing with the gear wheel 5, is moved down via gear rod section 4a. This corresponds to the "locked" position of locking unit 4, 5 shown in FIG. 3B. In contrast, the retracted position of the actuating element or locking journal 4 in relation to housing 7 is part of the "unlocked" position of the locking unit 4, 5, as shown in FIG. 3A.

The housing 7 comprises a support part 7a and a cover part 7b. The support part 7a does not only provide the support of the gear wheel 5 but only ensures that the drive journal 8 and the actuating element or locking journal 4 are guided and supported in the respective housing 7 or the support part 7a. In order to seal both housing parts 7a, 7b from each other, a sealing 9 is also provided. In the example, the bearing part 7a and the seal 9 define a two-component assembly 7a, 9 made of plastic. For this purpose, the bearing part 7a can be made of thermoplastic plastic, whilst the seal 9 is an elastomeric plastic, as already described in the introduction.

In general, also the cover part 7b can contain a respective seal 9. This is, however, not shown. In addition to the at least one seal 9 between the two housing sections 7a, 7b, the example embodiment also contains additional seals 10, 11. These are sealing rings 10, 11, by means of which a guide 12 for the actuating element or the locking journal 4 in housing 7 is, on one hand, sealed. On the other hand, the further seal or the sealing ring 11 ensures that the actuator 6 is sealed from the housing 7. For this purpose, the bearing part 7a contains a seat 13 for the actuator 6 in the example. The actuator 6 positioned on the seat 13 is now sealed with the aid of the seal 11 or the sealing ring 11 provided at this point from the housing 7 or the cover part 7b of the housing 7.

As a whole, the actuator 6, the transmission element 5 or the gear arrangement 5 including the accommodating housing 7 and lastly the actuating element emerging from the housing 7 or the locking journal 4 form an assembly 4, 5, 6, 7 sealed against environmental influences. This assembly 4 to 7 can be easily mechanically connected to the socket 1 with the seal 10 at this point providing an additional sealing for the respective assembly 4 to 7 in relation to the socket 1 or a respective housing. This simplifies assembly and reduces costs.

The invention claimed is:

1. An electric plug-in connection comprising a socket for receiving a plug;
   the electric plug-in connection further including:
   a locking unit for automatic locking of the socket and the plug, the locking unit comprising a blocking element having a gear rod section and a transmission element built as a gear arrangement, the blocking element arranged at a first end of the transmission element; and
   an actuator for actuating the locking unit when the actuator is electrically actuated,
   wherein the actuator is arranged at a second end of the transmission element opposite the first end and causes a first linear movement which is translated into a second linear movement perpendicular to the first linear movement via the blocking element.

2. The plug-in connection according to claim 1, wherein the gear arrangement is a deflection gear and/or a transmission/reduction gear.

3. The plug-in connection according to claim 1, wherein the gear arrangement is acted upon by a drive journal of the actuator.

4. The plug-in connection according to claim 1, wherein the blocking element is a locking journal.

5. The plug-in connection according to claim 3, wherein the drive journal contains a gear rod section.

6. The plug-in connection according to claim 3, wherein the drive journal and the blocking element are arranged at a right angle to each other.

7. The plug-in connection according to claim 3, wherein the drive journal and the blocking element are connected by at least one gear wheel as a drive means.

8. The plug-in connection according to claim 1, wherein the gear arrangement is arranged in a housing.

9. The plug-in connection according to claim 8, wherein the housing comprises a support part and a cover part.

10. The plug-in connection according to claim 8, wherein at least one seal is provided between the two housing parts.

* * * * *